(12) United States Patent
Richard et al.

(10) Patent No.: US 6,931,357 B2
(45) Date of Patent: Aug. 16, 2005

(54) COMPUTER NETWORK MONITORING WITH TEST DATA ANALYSIS

(75) Inventors: Dana K. Richard, Medina, MN (US); Roger T. Richardson, Hopkins, MN (US); Lisa D. Ludgate, Brooklyn Park, MN (US); Robert R. Beyer, Mound, MN (US); William C. Collette, Stillwater, MN (US)

(73) Assignee: Computer Network Technology Corp., Minneapolis, MN (US)

( * ) Notice: Subject to any disclaimer, the term of this patent is extended or adjusted under 35 U.S.C. 154(b) by 78 days.

(21) Appl. No.: 10/623,055

(22) Filed: Jul. 18, 2003

(65) Prior Publication Data

US 2004/0098230 A1 May 20, 2004

Related U.S. Application Data

(60) Provisional application No. 60/422,736, filed on Oct. 31, 2002, and provisional application No. 60/396,598, filed on Jul. 18, 2002.

(51) Int. Cl.[7] .................................................. G06F 11/30
(52) U.S. Cl. ..................................... 702/188; 702/186
(58) Field of Search ........................ 702/117–120, 122, 702/182–188

(56) References Cited

U.S. PATENT DOCUMENTS

| | | | | |
|---|---|---|---|---|
| 5,303,166 A | * | 4/1994 | Amalfitano et al. | ........ 702/186 |
| 5,812,780 A | * | 9/1998 | Chen et al. | ................. 709/224 |
| 5,819,066 A | * | 10/1998 | Bromberg et al. | .......... 707/102 |
| 6,138,157 A | * | 10/2000 | Welter et al. | ................ 709/224 |
| 6,157,940 A | * | 12/2000 | Marullo et al. | ................ 703/27 |
| 6,167,534 A | * | 12/2000 | Straathof et al. | ............. 714/38 |
| 6,317,787 B1 | * | 11/2001 | Boyd et al. | .................. 709/224 |
| 6,324,492 B1 | * | 11/2001 | Rowe | .......................... 703/13 |
| 6,360,332 B1 | * | 3/2002 | Weinberg et al. | ............... 714/4 |
| 6,477,483 B1 | * | 11/2002 | Scarlat et al. | ............... 702/186 |
| 6,519,714 B1 | * | 2/2003 | Sweet et al. | ................... 714/28 |

* cited by examiner

*Primary Examiner*—Marc S. Hoff
*Assistant Examiner*—Craig Steven Miller
(74) *Attorney, Agent, or Firm*—Beck & Tysver, PLLC

(57) ABSTRACT

The present disclosure is directed to a method and system for analyzing network performance by creating benchmark test results when the computer network is initialized, and subsequently testing the network while operational to determine degradations. This method and system can proactively determine problems before they result in network failures, or immediately detect network failures even before the user is aware of them. In one aspect, the disclosure is directed to a method of monitoring at least one computer network from a remote location. The method includes benchmark-testing at least one computer network with test data provided from the remote location to obtain benchmark test results. Often, benchmark-testing is performed when the network is initialized. Once operational, the remote location will perform operational-testing of at least one computer network with sample data provided from the remote location to obtain operational test result. Operational-testing is performed while at least one computer network is carrying live data storage traffic. The operational test results are compared to the benchmark test results to determine network degradation. Immediate failures can be determined as well as trending of test results can be used to predict failures.

13 Claims, 4 Drawing Sheets

COMPUTER NETWORK MONITORING WITH TEST DATA ANALYSIS

REFERENCE TO CO-PENDING APPLICATION

This patent application claims priority to co-pending U.S. provisional application for patent filed on Oct. 31, 2002, having Ser. No. 60/422,736, and titled "Network Monitoring Utilizing Test Data Analysis" and to co-pending U.S. provisional application for patent filed on Jul. 18, 2002, having Ser. No. 60/396,598, and titled "Network Testing Method."

BACKGROUND

The present disclosure relates to computer networks. Specifically, the present disclosure relates to systems and methods for monitoring or testing computer networks.

Many users of computer generated information or data often store the information or data locally and also replicate the data at remote facilities. These remote facilities can be on multiple sites, perhaps even around the world, to ensure the data will be available in case one or some of the facilities fail. For example, a bank may store information about a person's savings account on a local computer storage device and may replicate the data on remote storage devices around the country or around the world. Thus, information regarding the savings account and access to the funds in the savings account is available even if one or some of these storage devices were to fail for whatever reason.

In general, computer data is generated at a production site and can also be stored at the production site. The production site is one form of storage area network. The production site is linked over a wide area network, such as the Internet or a dedicated link, to one or more remote alternate sites. Replicated data is stored at the alternate sites. The alternate site is another form of storage area network. Often, a storage area network can be a hybrid where it functions to generate and store local data as well as replicate data from another storage area network. Many storage area networks can be linked over the wide area network. In the example above, one storage area network could be at a bank office. The storage area network is connected over a wide area network to remote locations that replicate the data. These locations can include other bank offices or a dedicated storage facility located hundreds of miles away.

The computer network is operating smoothly if certain service level criteria are met. The described computer networks include hundreds of components including hardware and software components that may be scattered throughout the world. If one or more components fail and at least some of the service level criteria are not met, data stored on the network may be unavailable, performance may be affected, and other adverse symptoms can occur. Research has demonstrated that a user of the computer network, such as the bank, will take fifty-four minutes to report a critical failure to a network administrator. During this time, the computer network has not been operating properly and the benefits of storing information at multiple locations has been reduced or lost.

A number of solutions are available to prevent certain types of local problems from occurring, before they arise. Other solutions require a technician to come to a user to test the computer network. Of course, this test is performed at lengthy intervals because of associated costs and logistics. These solutions suffer from the disadvantages of either not testing the network completely or too infrequently. Further, if problems do arise in the network, the user is generally required to alert the network administrator. In this scenario, valuable network time is lost before the network administrator is even ready to respond to the user, let alone address the problem.

Additionally, solutions are available that test the components of the network. These solutions test selected components in a point-by-point method. Such a method does not provide a complete and accurate picture of the network. For example, the point-by-point method only tests part of the network at a time, and this part may be shared in whole or in part by other traffic. Additionally, this test taxes the processing power of the network component, which is not necessarily related to its ability to handle data. Traffic is choked while the network component is tested because the processor is running a test rather than being stressed with data.

SUMMARY

The present disclosure is directed to a method and system for analyzing network performance by creating benchmark test results when the computer network is initialized, and subsequently testing the network while operational to determine degradations. This method and system can proactively determine problems before they result in network failures, or immediately detect network failures even before the user is aware of them.

In one aspect, the disclosure is directed to a method of monitoring at least one computer network from a remote location. The method includes benchmark-testing at least one computer network with test data provided from the remote location to obtain benchmark test results. Often, benchmark-testing is performed when the network is initialized. Once operational, the remote location will perform operational-testing of at least one computer network with sample data provided from the remote location to obtain operational test result. Operational-testing is performed while at least one computer network is carrying live data storage traffic. The operational test results are compared to the benchmark test results to determine network degradation. Immediate failures can be determined as well as trending of test results can be used to predict failures.

The benchmark testing and operational testing can be accomplished with a software only solution that does not require specialized hardware to test the existing network. The software can be web deployable from the remote site. The software generates traffic that emulates storage data traffic and fully stresses the network. In one example, the software can be downloaded or otherwise instigated by the user, with the remote site accessing the test.

The systems and methods of the disclosure include many advantages. Among these advantages are that the entire data path is tested, from channel to network to channel. The test can transcend protocols and communication methods. In addition, the test data rides along with the storage data across the network path. The test is therefore benign to the network path, and does not require the network components to perform additional processing tasks. The tests produce accurate accounts of the network status.

DESCRIPTION

This disclosure relates to systems and methods for monitoring or testing a computer network. The disclosure, including the figures, describes the systems and methods for monitoring or testing computer network with reference to a several illustrative examples. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

Figure 1:
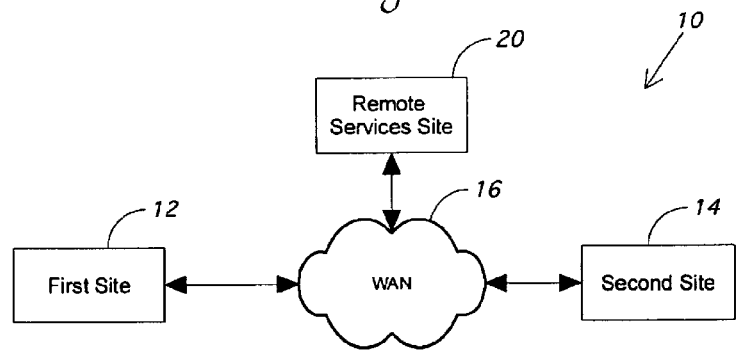
FIG. 1 is a schematic example of a computer network environment incorporating features of the present disclosure.

FIG. 1 is a schematic example of a computer network environment 10. The network environment 10 includes a first site 12 and a second site 14, where the first and second sites are connected together over a wide area network 16 to form a computer network 18. A remote services site 20 is also connected to the network 18, in the example, over the wide area network 16. In one example, the wide area network is the Internet. The first and second sites can be connected via the wide area network using a broad range of network interfaces including IP, ATM, T1/E1, T3/E3, and others. Information can be created or manipulated at one site and transferred to another site for additional processing or storage. In the case of the computer network comprising two sites that are storage area networks, information is created or manipulated at the first site, stored at that site, and then replicated and stored at the second site.

Figure 2A:
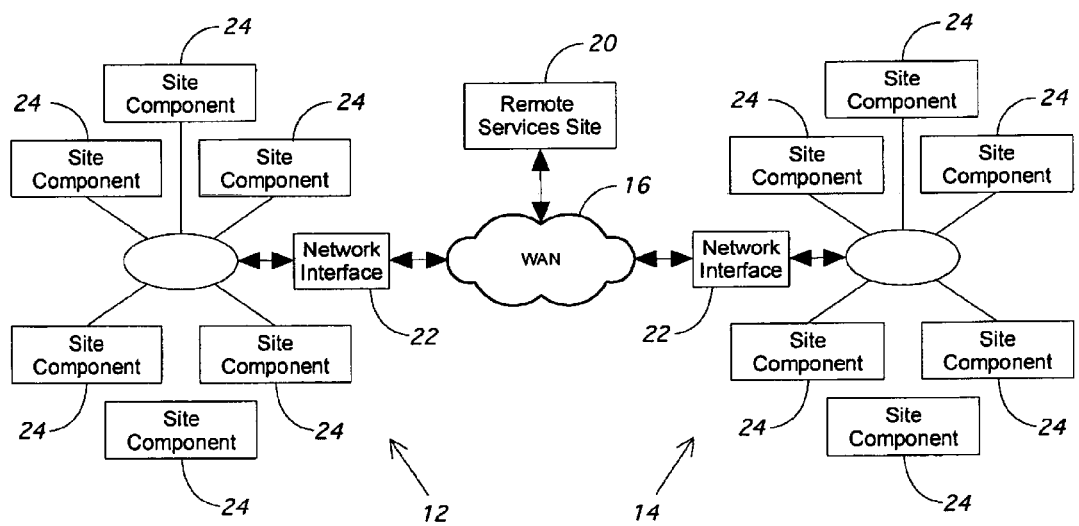
FIG. 2A is a schematic example of a more detailed example of the computer network environment of FIG. 1.

FIG. 2A shows the schematic example of the computer network environment 10 with a schematic example of components of the first and second sites 12, 14. In the example, the first and second sites are connected to the wide area network 16 through network interfaces 22. Network interfaces 22 are generic descriptions of devices such as routers, directors, or the like. The interfaces 22 are operably coupled to site components 24, such as servers, printers, data storage devices, and the like. The site components can communicate with each other over a variety of methods such as Ethernet, FICON, iSCSI, Fibre Channel, ESCON, Infiniband, and others. In one example, the interface 22 is a storage router and is operably coupled to site components 24 such as servers and storage devices through a Fibre Channel switch. In another example, the interface 22 is an ESCON director that is connected to components such as document processors, printers, servers, controllers, storage media, terminals and consoles. The site components 24 at each site 12, 14 need not be at the same facility. Many components with ESCON technology can operate at distances of up to 60 kilometers. With additional technologies, such as directors sold under the trademark UltraNet Xtension Director available from the present assignee, can extend mainframe channels so that components 24 for each site can be located almost anywhere in the world.

Figure 2B:
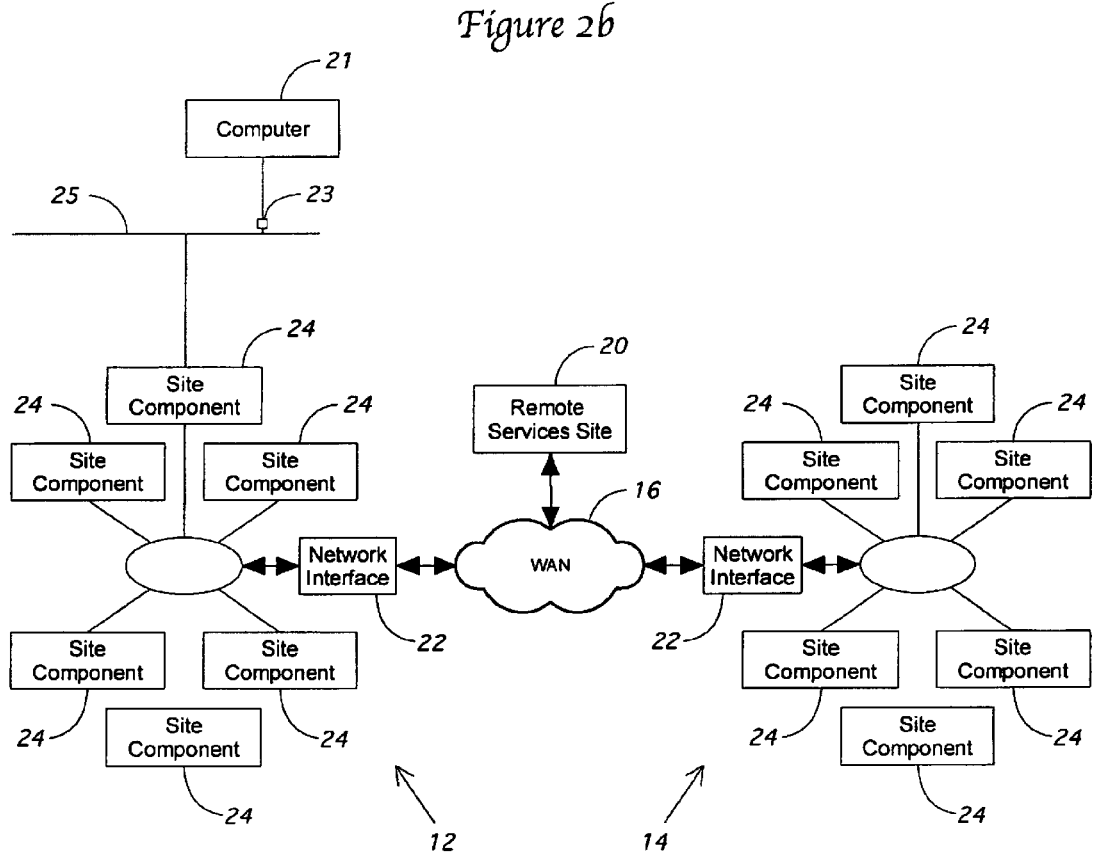
FIG. 2B is a schematic example of an alternative example of a computer network to FIG. 2A.

FIG. 2B is another example of the storage system 20 where like parts are labeled with like reference numbers. In the example of the figure, the remote services site is not connected to the network 22 through the Internet 16. Rather, the remote services site has been replaced with a software application adapted to run on a programmable device 21, such as a computer, operably coupled to the network at one of the sites 12. In the example, the computer 21 is operably coupled to the network via an Ethernet connection 23. The computer is connected to the network backbone 25, or Ethernet, and to the storage area network through a router, or the like. In the example, the software application performs the functions of the remote services site.

Figure 3:
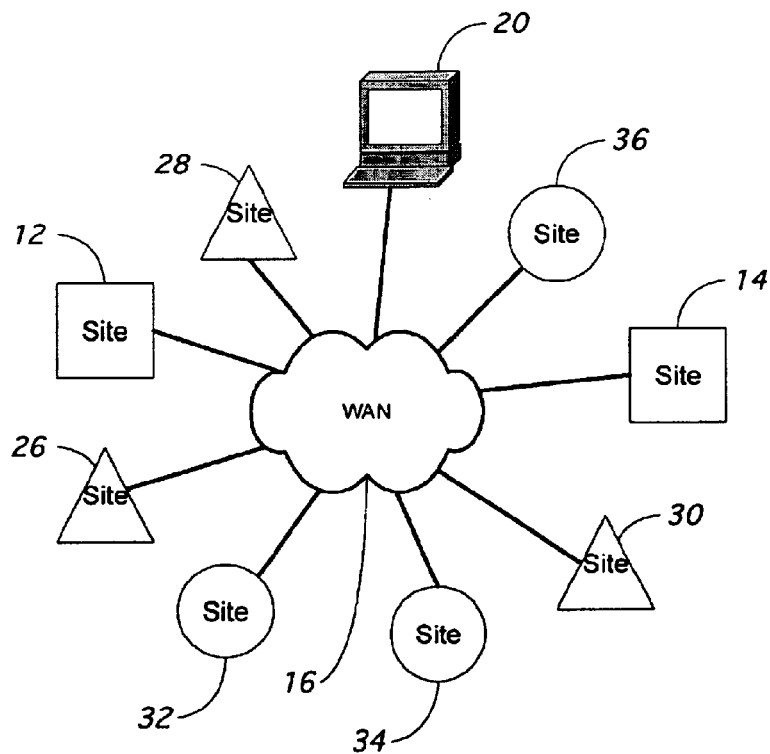
FIG. 3 is a schematic example of another computer network environment incorporating features of the present disclosure.

FIG. 3 shows the remote services site 20 coupled to several computer networks all connected to the wide area network 16. Computer network 18, having sites 12 and 14 are shown in FIG. 3. An additional computer network, having sites 26, 28 and 30 are also connected together over the wide area network 16. Still another computer network, having sites 32, 34 and 36 are connected together over the wide area network 16. Additional computer networks connected together over the wide area network are contemplated. Also, computer networks with more than three sites are contemplated. In the example, the computer networks can be completely exclusive of each other, or nearly exclusive of each other, sharing only information such as web pages, or the like. In the example, the remote services site 20 is configured to operate on each computer network desiring services. In addition, the remote services site independently provides services to each computer network desiring services.

Figure 4:
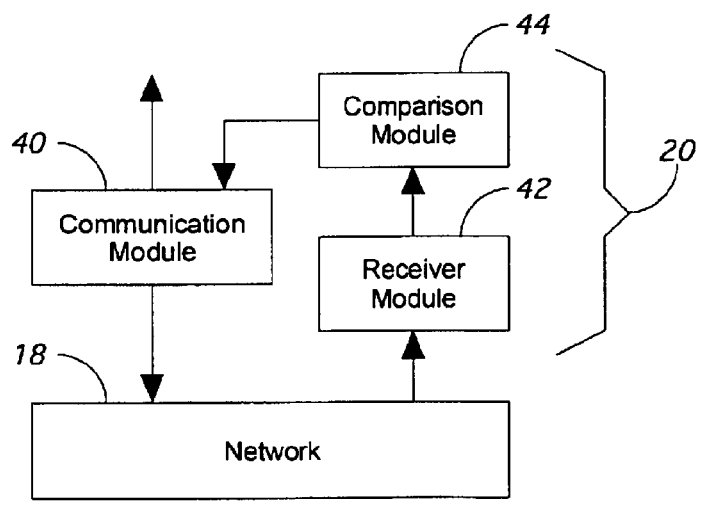
FIG. 4 is a block diagram of a system for monitoring or testing computer network environments such as those in FIGS. 1 through 3.

FIG. 4 shows a block diagram of modules included in the remote services site 20. The remote services site 20 includes a communications module 40, a receiver module 42 and a compare module 44. In the example, the communication module provides test packets or test data to the computer network 18. The test packets or test data can emulate actual data on the network and fully stress the network. The computer network will process the test data or test packets and provide the results to the receiver module 42. The test results will be compared to initial benchmark tests previously performed on the network at the compare module 44. A comparison is made to determine if the current test results deviate from the initial test results. Deviations of the test results are recorded, and remarkable deviations are provided to the communications module 40 to create an alert to the computer network 18, the remote services site 20, or both.

Benchmark tests are performed when the computer network 18 is initialized. This includes circumstances such as when the computer network 18 is new and first put into service, or when changes are made to optimize the network. Other circumstances for initialization are contemplated. Benchmark testing may occur continuously over a period of days, for example, that can create changes in bandwidth that emulate variations of a production environment, i.e., actual operation of the network. In one example, benchmark testing is a looping test performed hour after hour for twenty-four to forty-eight hours. The results are captured and returned to the remote services site 20. In one example, the results are returned via an FTP. Benchmark tests are typically performed while the network is not carrying live storage data traffic. In addition to the remote services site providing tests, a computer can be included at each site 12, 14 that pushes and pulls test data such as additional loads to and from the network 18. The results are stored and compared to future tests.

Subsequent tests detect deviations from the benchmark data. In one example, the remote services site 20 can test the ability of the network to handle the stresses of large traffic volume, such as that created by data storage traffic. The network is monitored and tested under stress conditions. The results of the tests are used to help identify weaknesses in the network equipment, bandwidth, third party systems, or other issues. In general, these "operational tests" are performed while the network is carrying live storage data. The operational tests can be carried out randomly, at regular intervals, or otherwise. In one example, operational tests are conducted once every hour. These tests can carry enough data to substantially consume the bandwidth of the network.

Operational tests can stress the entire network or only a selected portion of the network. The operational test can be configured to test all elements of the network, from end to end. The operational test can be configured to test multiple protocols and multiple levels of the network. In another version, the operational testing is conducted only on preselected components or aspects of the network. For example, a user that includes all aspects of the enterprise on a single network may only wish to monitor and test the data storage aspect, or cross-continental information traffic, and so one. Other subsets could be edge to core or core to edge, as understood by those skilled in the art.

In one example, the remote site generates test data that is then attached to, or rides along with, actual storage data. The total data created by the test data and storage data is traffic data. In one example, the traffic data is substantially the same as the bandwidth of the network. The traffic data begins at a point in one storage area network and is passed through the network to a point within the second storage area network and then back again.

The results of the operational test are compared to the benchmark testing to determine if there are deviations. In addition, analysis can be performed on the deviations to determine whether the deviations are remarkable and require attention. Less remarkable deviations can be logged and brought to the attention of the network administrator at an appropriate time. Still further, trending analysis can be performed on the test results over a period of time. For example, if trending analysis indicates a certain feature or component of the network is degrading over time, an alert may be provided to the network administrator predicting a failure of the component or feature.

Figure 5:
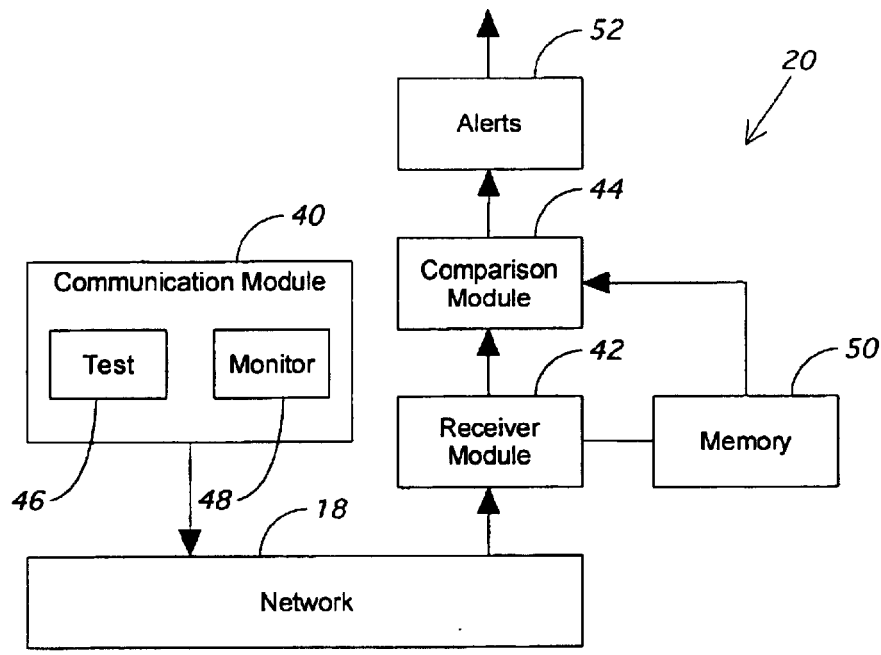
FIG. 5 is a block diagram of another system for monitoring or testing computer network environments such as those in FIGS. 1 through 3.
Figure 6:
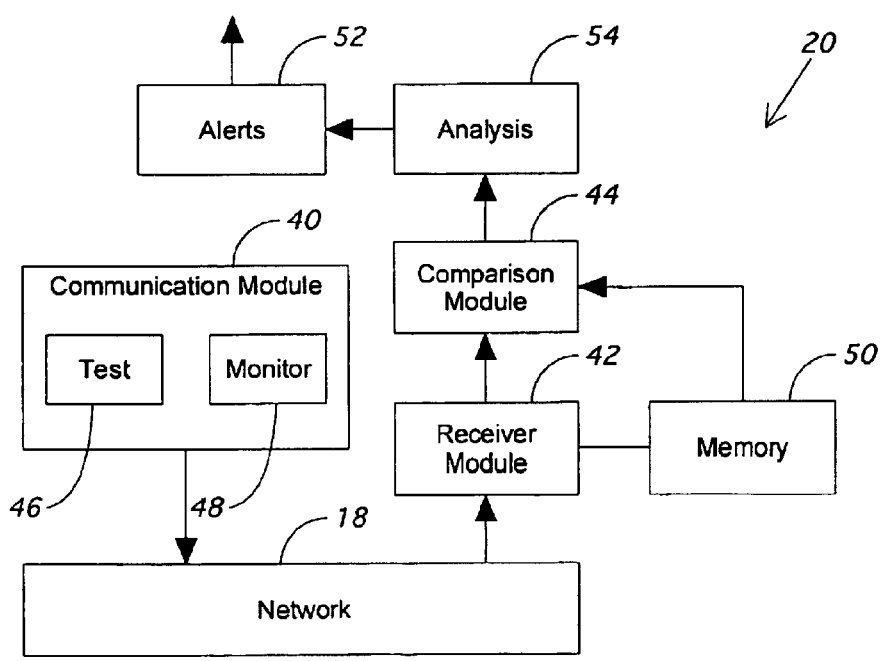
FIG. 6 is a block diagram of still another system for monitoring or testing computer network environments such as those in FIGS. 1 through 3.

Tests can be devised for traditional performance test measurements. Such performance test measurements are known in the art. These metrics include issues of throughput, packet loss, latency, frame loss rate, jitter, interframe gap, and others now known in the art. The tests can be performed in a software only solution operated from the remote site. FIGS. 5 and 6 describe additional solutions included at the remote site.

FIG. 5 shows a schematic example of another system that can be included in the remote services site. Like parts are labeled with like reference numerals. In the example, the communication module 40 includes a test module 46 and a monitor module 48. The test module 46 can be used to selectively and actively test the computer network 18 in the manner described above, whereas the monitor module can passively check the system to detect degradation or failures. In addition to the receiver 42 and comparison 44 modules, the system includes a memory 50 and an alerts module 52. Memory 50 is suitable for storing the benchmarking test results. The benchmarking test results are provided to the comparison module 44 to determine if there is any deviation from the testing data. The alerts module 52 can provide the appropriate type of alert to a network administrator, user, or both if there are deviations.

FIG. 6 shows still another example of the system that can be included in the remote services site 20. In this example, the system includes an analysis module 54 operably coupled to the comparison module 44. The analysis module can perform certain functions regarding the results of the test data and its comparison to the benchmarking data. For example, the analysis module can graph the test data over time to determine trends in any deviation from benchmarking data. This can be useful for predicting failures in the network. If certain trends are apparent, the alerts module can send a signal to the network administrator to warn of a possible impending failure. In addition, the analysis module 54 can prioritize issues prior to sending an alert. Additional functions of the alerts module 54 are contemplated.

One example of prioritization is to assign a criticality to each network event. Events that are more critical are treated first, while events that are less critical, such as events where immediate correction could adversely affect import functions of the network, are treated at an appropriate time. One embodiment divides the events into three categories of criticality. The first category, severity 1, includes conditions or events that impact the operation of the network to where the network or application is unusable. Severity 2 includes conditions or events that impact the operation but the network is still usable. Severity 3 includes conditions that create little or no impact to the user. Prioritization is based on events falling into a particular category.

Application of the system monitors bandwidth and interference utilization, interface availability, and other factors related to the quality of the network. Application of the system provides several features. Among these are remote and proactive network monitoring and management. In addition, the system provides quick event notification that provides for fast response and perhaps fast correction. In connection with this, the system can provide real-time corrective action notification and documentation. The system can also store information and test results, and it can generate network performance statistics for long term analysis.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein, but rather by the appended claims and equivalents.

What is claimed is:

1. A method of monitoring at least one computer network, comprising:

benchmark-testing the at least one computer network with test data to obtain benchmark test results relating to data storage traffic from a first site passing over a wide area network to a second site;

electronically forwarding the benchmark test results to a remote services site separate from the first site and the second site;

periodically operational-testing the at least one computer network with sample data sent from the first site to the second site over the wide area network to obtain operational test result, wherein the operational-testing is performed while the at least one computer network is carrying live data storage traffic;

electronically forwarding the results of the operational-testing to the remote services site; and comparing at the remote services site the operational test results to the benchmark test results to determine network degradation.

2. The method of claim 1 wherein the benchmark-testing is performed when the at least one computer network is initialized.

3. The method of claim 2 wherein the benchmark-testing includes emulating a production environment.

4. The method of claim 3 wherein emulating the production environment includes generating variations in bandwidth.

5. The method claim 1 wherein the benchmark testing is performed continuously for twenty-four to forty-eight hours.

6. The method of claim 5 wherein the benchmark-testing is a looping test.

7. The method of claim 1 wherein the benchmark-testing includes a computer connected to the at least one computer network in addition to the remote site, wherein the computer pushes and pulls test data.

8. The method of claim 1 wherein the benchmark-testing is performed while the at least one computer network is not carrying live data storage traffic.

9. The method of claim 1 wherein the operational-testing is performed at regular intervals.

10. The method of claim 9 wherein the operational-testing is performed once every hour.

11. The method of claim 1 wherein the remote location is operably coupled to the at least one computer network via the Internet.

12. The method of claim 1, wherein the sample data is attached to the live data storage traffic.

13. The method of claim 1, wherein the sample data rides along with the live data storage traffic.

* * * * *